(12) United States Patent
Ling

(10) Patent No.: US 8,497,802 B2
(45) Date of Patent: Jul. 30, 2013

(54) GNSS RECEPTION USING DISTRIBUTED TIME SYNCHRONIZATION

(75) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 114 days.

(21) Appl. No.: 12/980,202

(22) Filed: Dec. 28, 2010

(65) Prior Publication Data

US 2012/0001797 A1 Jan. 5, 2012

Related U.S. Application Data

(60) Provisional application No. 61/290,449, filed on Dec. 28, 2009.

(51) Int. Cl.
*G01S 1/24* (2006.01)

(52) U.S. Cl.
USPC .......................................................... 342/387

(58) Field of Classification Search
USPC .......................................................... 342/387
See application file for complete search history.

(56) References Cited

U.S. PATENT DOCUMENTS

| | | | |
|---|---|---|---|
| 7,292,188 B2 | 11/2007 | Rowitch | |
| 7,693,130 B2 * | 4/2010 | Barry et al. | 370/350 |
| 8,233,432 B2 * | 7/2012 | Northcutt et al. | 370/328 |
| 2004/0146093 A1 | 7/2004 | Olson et al. | |
| 2007/0171125 A1 * | 7/2007 | Abraham et al. | 342/357.09 |
| 2008/0209489 A1 | 8/2008 | Joyce et al. | |
| 2009/0233622 A1 * | 9/2009 | Johnson | 455/456.3 |
| 2009/0315768 A1 * | 12/2009 | Abraham | 342/357.09 |
| 2010/0069035 A1 * | 3/2010 | Johnson | 455/404.1 |
| 2010/0245568 A1 * | 9/2010 | Wike et al. | 348/143 |

FOREIGN PATENT DOCUMENTS

WO WO 2006/015290 A2 2/2006

OTHER PUBLICATIONS

International Search Report and Written Opinion corresponding to the PCT application No. PCT/US2010/062258, date of mailing Mar. 21, 2011, 9 pages total.
International Preliminary Report on Patentability for Application No. PCT/US2010/062258 mailed on Jul. 12, 2012, 7 pages.

* cited by examiner

*Primary Examiner* — Harry Liu
(74) *Attorney, Agent, or Firm* — Kilpatrick Townsend & Stockton LLP; Ardeshir Tabibi

(57) ABSTRACT

A GNSS receiver communicates with any connectivity device, such as a WiFi device that is, in turn, in communication with a wired network having access to the DTI timing. Such connectivity devices may set their timing and frame synchronization to the DTI and thus serve as Geoposition beacons, thereby enabling the GNSS receiver to accurately determine its position. The GNSS receiver may also use the DTI timing supplied by such a network to perform relatively long integration time so as to achieve substantially improved sensitivity that is necessary for indoor Geopositioning applications. Furthermore, the GNSS data, such as satellite orbital information, may also be propagated by such devices at high speed. By providing this data to the GNSS receivers via such connectivity devices in a rapid fashion, the GNSS receivers are enabled to receive the transmitted data associated with the satellite without waiting for the GNSS transmission from the satellites.

20 Claims, 2 Drawing Sheets

GNSS RECEPTION USING DISTRIBUTED TIME SYNCHRONIZATION

CROSS-REFERENCES TO RELATED APPLICATIONS

The present application claims benefit under 35 USC 119 (e) of U.S. provisional application Ser. No. 61/290,449, filed Dec. 28, 2009, entitled "GNSS Reception Using Distributed Time Synchronization", the content of which is incorporated herein by reference in its entirety.

BACKGROUND OF THE INVENTION

GNSS receiver systems can increase their sensitivity by integrating the received GNSS signals over a longer period of time, so long as the time base used within the receiver is sufficiently stable over that time period. The stability of the crystal oscillator used in low-cost commercially-available consumer-grade GNSS receiver devices restricts the coherent integration time to below 10 seconds. Consumer GNSS devices are often used in mobile environments, resulting in timing changes due to their motion.

A typical GNSS receiver system may not have up-to-date satellite information and thus would need to perform an extensive search of frequency and code offsets for each satellite in order to synchronize its time to the GNSS time and achieve lock. FIG. 1 shows the space that is searched by a conventional GNSS system, such as a GPS.

When a GNSS receiver initially locks to a satellite, it needs to scan frequency offsets and code offsets to account for the drift in the receiver's time base, which is often provided by a low-cost crystal oscillator. This search must be repeated if the GNSS receiver stops tracking signals from the GNSS satellite system which may happen for a number of reasons. The coherent integration time used by consumer-grade GNSS receivers is limited by a variety of factors including stability of the timebase at the receiver, and the prohibitive cost, power and size of a timebase which would enable longer integration times. If a GNSS receiver loses lock for some period of time (such as when it is indoors), its time base will quickly drift away from the GNSS time reference. Such drifts prevent the receiver from acquiring the GNSS signals or performing coherent integration over longer periods of time during acquisition.

BRIEF SUMMARY OF THE INVENTION

A method of locating the position of a wireless receiver, in accordance with one embodiment of the present invention includes, in part, receiving from a wired network timing information that is substantially synchronous with the GNSS clock, transmitting the timing information wirelessly to the wireless receiver, and locating the position of the wireless receiver using the transmitted timing information. In one embodiment, the wireless receiver is a GNSS receiver. In another embodiment, the wireless receiver is a connectivity device conforming to a wireless standard, such as 802.11a, 802.11b, 802.11g, 802.11n, Bluetooth, WiMax, Zigbee, UWB, 60 GHz, and the like.

A method of locating the position of a device, in accordance with one embodiment of the present invention includes, in part, receiving from a wired network a clock signal that is substantially synchronous with the GNSS clock, transmitting the received clock signal wirelessly, receiving the transmitted clock signal by a first wireless transceiver, transmitting a first frame from the first wireless transceiver substantially synchronously with the GNSS clock, receiving the transmitted first frame by the device, and attempting to identify the position of the device, in part, using the information received from the first frame. In one embodiment, the position of the device is determined using, in part, the information received from the first frame together with information representative of the distance between device and a second wireless transceiver.

In accordance with one embodiment of the present invention, the wired network is a DOCSIS-compliant network supplying DTI timing information represented by the clock signal. In one embodiment, the wired network is further adapted to receive ephemeris information associated with GNSS satellites. In one embodiment, the device is a GNSS receiver.

In one embodiment, the first frame includes Geolocation information representative of the position of the first wireless transceiver. In one embodiment, the Geolocation information includes time stamp representative of the transmission time of the first frame. In one embodiment, the method further includes, in part, receiving at least one GNSS signal from at least one GNSS satellite by the GNSS receiver, and attempting to identify the position of the GNSS receiver using information received from the first frame and the received GNSS signal.

In one embodiment, the method further includes in part, receiving by the second wireless transceiver, a second frame transmitted substantially synchronously with the GNSS time by a third wireless transceiver, and attempting to identify the position of the second wireless transceiver using information received from the first frame, second frame, and the GNSS signal. In one embodiment, the method further includes, in part, transmitting the ephemeris information wirelessly to the first wireless transceiver; and transmitting the ephemeris information wirelessly from the first wireless transceiver to the GNSS receiver. In one embodiment, the method further includes transmitting the clock signal wirelessly from the first wireless transceiver to the GNSS receiver; and enabling the GNSS receiver to use the clock signal to increase its integration time. In one embodiment, the wireless transceiver is a connectivity device conforming to a wireless standard, such as 802.11a, 802.11b, 802.11g, 802.11n, Bluetooth, WiMax, Zigbee, UWB, 60 GHz, and the like.

DETAILED DESCRIPTION OF THE INVENTION

Embodiments of the present invention advantageously use the accurate time reference provided by a wired network, such as the DOCSIS-compliant cable infrastructure. Such accurate timing references are often specified to be synchronized to a GNSS system with atomic clock stability. In the following it is understood that:

GNSS time refers to the time which is derived from a GNSS-based time source; the term GNSS time is used herein interchangeably with absolute time;

Geopositioning refers to determining the three-dimensional coordinates (position) of a device, and optionally its velocity and time; the term Geopositioning is used herein interchangeably with the terms positioning or locating;

WiFi refers to any wireless connectivity standard, such as 802.11a, 802.11b, 802.11g, 802.11n, Bluetooth, WiMax, Zigbee, UWB, 60 GHz, and the like;

DTI refers to any stable time base provided by a wired system and which remains synchronous with GNNS time; the DOCSIS Timing Interface Specification (DTI) is one such time base.

The following embodiments of the present invention are provided with reference to a cable system provisioned with DTI time. It is understood, however, that embodiments of the present invention are equally applicable to any other system that provides a stable time base that is maintained synchronous with the GNSS time with the desired accuracy.

In accordance with one embodiment of the present invention, a GNSS receiver communicates with any connectivity device, such as a WiFi (wireless LAN), Bluetooth, WiMax and Femtocell device, that is, in turn, in communication with a wired network having access to the DTI. Such connectivity devices may set their timing (e.g., frame synchronization) to the DTI and thus serve as Geoposition beacons thus enabling the GNSS receivers to accurately determine their positions. In accordance with another embodiment of the present invention, a GNSS receiver uses the DTI supplied by such a network to perform relatively long integration time so as to achieve substantially improved sensitivity that is necessary for indoor Geopositioning applications. Furthermore, the GNSS data, such as satellite orbital information, may also be propagated by such devices at high speed. By providing this data to the GNSS receivers via such connectivity devices in a rapid fashion, the GNSS receivers are enabled to receive the transmitted data associated with the satellite without waiting for the GNSS transmission from the satellites.

Figure 1:
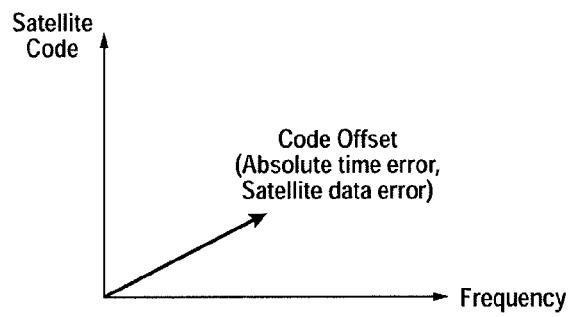
FIG. 1 shows the space that is searched by a conventional GNSS system, as known in the prior art.
Figure 2:
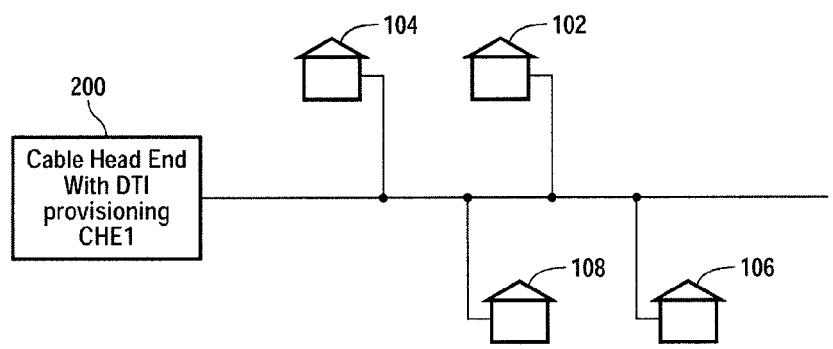
FIG. 2 shows a cable head end supplying the DTI timing signal to a number of customer premises.

Referring to FIG. 2, cable head end 200 which is provisioned with the DT1 transmits a cable signal, that is synchronous with the DTI, to customer premises (CP), such as CPs 102, 104, 106, and 108. Providing and maintaining precise time synchronization across the cable network allows reverse (upstream) channels at one such CP to transmit at precise timing intervals to avoid collisions with other CPs reverse channels. In other words, for example, CP 102 can transmit upstream to cable head end 200 without interfering with upstream signals from CP 104. The distance between the cable head end 200 and anyone of the CP's, such as CP 102, may be easily established by, for example, by determining the round-trip time of a signal transmitted from the cable head end 200 to CP 102.

Figure 3:
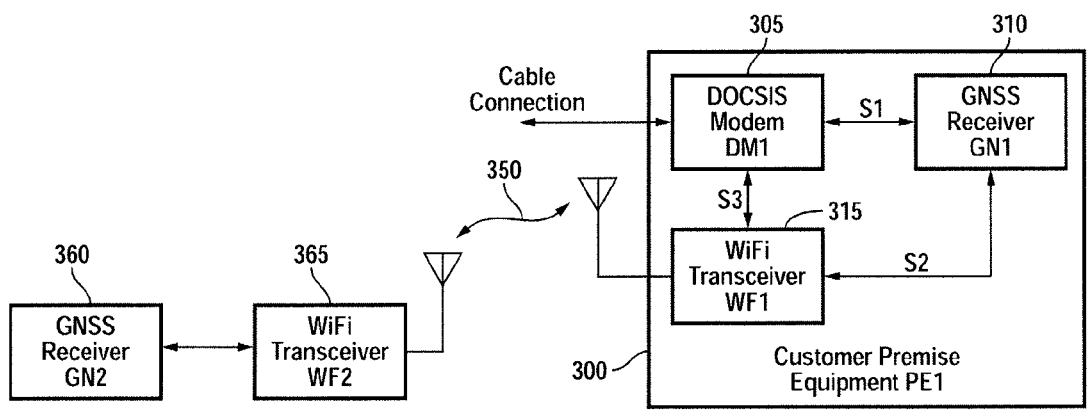
FIG. 3 show a number of blocks of a communication system, in accordance with one exemplary embodiment of the present inventive.

FIG. 3 show a number of blocks of a communication system, in accordance with one exemplary embodiment of the present invention. Exemplary customer premise 300 is shown as including a DOCSIS modem 305 which, in addition to being compliant with the upstream synchronization requirements, provides precise timing to all devices that are in communication within customer premise 300, shown in this embodiment as including a GNSS receiver 310, and a WiFi transceiver 315. The DTI time provided by DOCSIS modem 305 remains substantially synchronous, i.e., within a few nano-second, with the GNSS time.

As described above, DOCSIS modem 305 provides accurate timing information to GNSS receiver 310 as well as to WiFi transceiver 315. GNSS receiver 310 uses this timing information as a reference for correcting its own timing for integration of the GNSS signal, thereby increasing its sensitivity to GNSS signals for, e.g., indoor GNSS reception. GNSS receiver 310 may also use the DTI timing information to relatively quickly obtain updated GNSS information such as ephemeris data for GPS applications; this can be done on a regular basis to ensure that the integration is carried out over the ephemeris data bits to accommodate the longer integration times.

Using the DTI timing supplied by DOCSIS modem 305, WiFi transceiver 315 is also enabled to synchronize transmission of its preambles and headers in a predetermined fashion to the GNSS time. WiFi transceiver 315 may thus serve as a beacon whose transmissions are used by other receivers to establish their positions. For example, as shown in FIG. 3, the timing information supplied by WiFi transceiver 315's transmission is received by WiFi transceiver 365 via wireless link 350. WiFi transceiver 365, in turn, supplies this timing information to GNSS receiver 360. GNSS receiver 360 may use this timing information together with other timing and position information it receives from either GNSS satellites or other WiFi transceivers (whose positions are known and are synchronized to the GNSS time) to determine its position, in any one of a number ways, as described further below. WiFi transceiver 365 may also use the timing information it receives from WiFi transceiver 315 and other WiFi transceivers (all of which are assumed to have known positions and are synchronized to the GNSS time) to establish its position.

Figure 4:
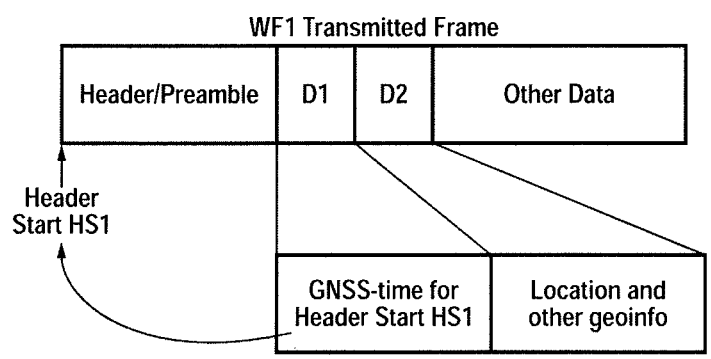
FIG. 4 shows a simplified exemplary frame synchronized to the GNSS time and transmitted by a WiFi transceiver, in accordance with one exemplary embodiment of the present inventive.

FIG. 4 shows a simplified exemplary frame transmitted by a WiFi transceiver, such as WiFi transceiver 315, that is synchronized to the DTI and the GNSS time. Such a WiFi transceiver, e.g., transceiver 315, is adapted to transmit its preambles such that, for example, the preamble's header start (HS1) bits are transmitted at, for example, microsecond, 10 microsecond, or 100 microsecond boundaries of the GNSS-time. Therefore, the time of arrival time of the HS1 bits at another WiFi transceiver, such as WiFi transceiver 365, may be used to determine the time-of-flight of the signal from WiFi transceiver 315 to WiFi transceiver 365. A WiFi standard, such as 802.11a standard, defines beacon frames having header bits contain the MAC address of the transceiver and a body that has the time stamp representing the frame's transmission time. WiFi transceiver 365 uses the time-of-arrival of the header bits of the frames transmitted by, e.g., WiFi transceiver 315, as a reference to measure the relative time-of-arrival of the headers bits transmitted by other WiFi transceivers (not shown). These relative times can then be used by a trilateration algorithm to establish the location of WiFi transceiver 365 as well as the absolute time. GNSS receivers 360 and 310 may determine their positions using, for example, signals from four or more WiFi receivers whose positions are known and whose transmissions are synchronized with the GNSS time. Alternatively, the GNSS receivers may use, for example, signals from two WiFi receivers whose positions are known and whose transmissions are synchronized with the GNSS time, as described above, together with the GNSS signals they receive from two satellites to establish their positions. It is understood that other combinations of GNSS satellite signals and WiFi signals may be used for position determination by a GNSS receiver which is not able to receive signals from at least four GNSS receivers to uniquely identify its position.

As described above, a WiFi transceiver may also include the time of transmission information (i.e., time stamp) in the data it transmits within a frame, thereby enabling the time-of-flight of a transmission from the transmitting WiFi transceiver to the receiving WiFi transceiver be established. For example, referring to FIGS. 3 and 4 concurrently, WiFi transceiver 315 may include data which establishes estimated GNSS time associated with, for example, the beginning (i.e. HS1), ending or some reference point within the frames it transmits. This enables WiFi transceiver 365 to, among other things, determine the time of flight information of the transmitted frames if WiFi transceiver 365 has an accurate estimate of the GNSS time. Furthermore, if WiFi transceiver 365 does not know the GNSS time but in addition to receiving such frames from WiFi 315, receives similar frames (e.g., frames that include the position of their associated transmitter as well as the transmission time of the frames) from three or more WiFi or other sources, then WiFi transceiver 365 can use standard trilateration techniques to establish its own position and time. If WiFi transceiver 365 receives fewer than three such frames (alternatively referred to herein as beacon signals), WiFi transceiver 365 may still be able to estimate its own position with less accuracy, by making assumptions, such as, that it sits at zero altitude on the earth's surface. It is understood that any combinations of the above techniques may be used by a WiFi transceiver to establish its location. A WiFi transceiver may also use the wireless network to obtain updated GNSS system data, such as orbital information, to aid a GNSS receiver, such as GNSS receiver 360 in rapid acquisition of satellite signals.

If a WiFi transceiver (e.g., WiFi transceiver 365) receiving the transmitted frames as described above, has access to the GNSS time, the receiving WiFi transceiver may directly establish its distance as $c \cdot t_f$ from the transmitting WiFi transceiver (e.g., WiFi transceiver 315) where c is the speed of light, and $t_f$ is the time-of-flight from the transmitting WiFi transceiver to the receiving WiFi transceiver. If the position of the transmitting WiFi transceiver is known (e.g. through a database) with a known degree of accuracy, the receiving transceiver can establish its position as being located on a sphere of radius $c \cdot t_f$ with the center of the sphere at the transmitting transceiver. A receiving transceiver may also be adapted to apply a well-known trilateration algorithm to the frames received from other WiFi transceivers, that are also synchronized with the DTI and whose positions are known, to establish the position of the receiving transceiver.

A receiving WiFi transceiver, such as WiFi transceiver 365, that includes a GNSS receiver, can improve its ability to locate its position by receiving transmissions, as described above, from the transmitting transceiver, such as transceiver 315, to either stabilize its time reference or synchronize its time to the GNSS-time. By doing so, the receiving transceiver can increase the time period over which it performs coherent integration of the GNSS signals so as to improve its position determination. Alternatively, the transmitting transceiver may access a database or an online source which contains the location information of the transmitting transceiver and supply this position information to the receiving transceiver. Such a database may for example, store the MAC address of a WiFi transceiver and its corresponding position.

In some embodiments, instead of broadcasting beacons periodically, the transmitting transceiver may provide GNSS-time and its position only upon request by another device. Therefore, the transmitting transceiver acts as a positioning beacon. The receiving device is not required to be in full compliance with, for example, any of the WiFi standards, to benefit from the beacon information provided by the transmitting transceiver. The receiving device may be required to implement only such portions of the standard as are necessary to synchronize with the transmitting transceiver or to obtain the transmitted position and time information. For example, the receiving device may be required to comply only with specification defining the receive side, or be able to perform synchronization using only the detected preamble. This enables the receiving device to be significantly less complicated than other devices and yet use the beacon information to determine its Geolocation.

Figure 5:
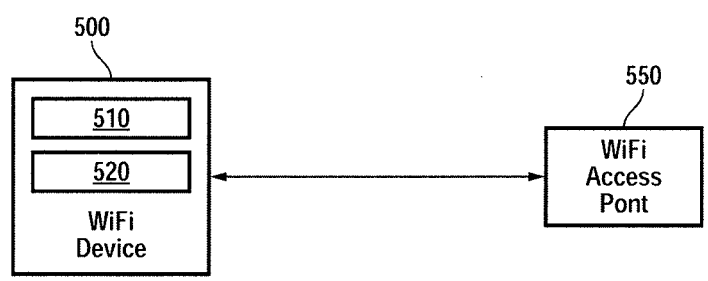
FIG. 5 shows a connectivity device adapted to determine the round-trip time of the packets it transmits, in accordance with one exemplary embodiment of the present inventive.

FIG. 5 shows a number of components of a connectivity device, such as a WiFi device 500, in accordance with one embodiment of the present invention, that is in communication with a WiFi access point 550. WiFi device 500 is shown as including a module 510 for recording transmission time of the packets it transmits by providing the packets with time stamps. The packets are received by access point 550 and sent back to WiFi device 500. Module 520 of WiFi 500 records the receipt time of the packets transmitted back to the wireless device by access point 550. Accordingly, the round-trip time of a packet transmitted and subsequently received by WiFi device 500 may be determined. The round-trip time represents the distance between WiFi device 500 and access point 550.

In some embodiments of the present invention, predetermined data sequences may be added to the Geoinfo bits to allow a device to improve its indoor positioning accuracy, i.e., to account for the effects of multipath within an indoor environment. For example, in an OFDM system, transmitting a known pattern of data symbols (i.e., referred to as pilot tones, training sequences, or preambles) allows the system to accurately estimate the channel in a relatively straightforward manner. Accordingly, such training sequences and coding may be added to the Geoinfo data (see FIG. 4) to make transmission of Geoinfo more reliable, thus allowing reliable reception of Geoinfo at much lower signal levels than the WiFi standard might otherwise permit. Referring to FIG. 4, if the transmitted frame The above embodiments of the present invention are illustrative and not limitative. Various alternatives and equivalents are possible. Other additions, subtractions or modifications are obvious in view of the present invention and are intended to fall within the scope of the appended claim.

What is claimed is:

1. A method of locating a position, the method comprising:
receiving, from a wired network, by a customer premises unit a clock signal that is substantially synchronous with a GNSS clock;
transmitting the received clock signal wirelessly by the customer premises unit;
receiving the transmitted clock signal using a first wireless device;
transmitting a first frame from the first wireless device substantially synchronously with the clock signal received by the first wireless device;
receiving the transmitted first frame at a second wireless device; and
attempting to identify a position of the second wireless device using information received from the first frame and information representative of a distance between the second wireless device and a third wireless device.

2. The method of claim 1 wherein said wired network is a DOCSIS-compliant network supplying DTI timing information represented by the clock signal.

3. The method of claim 1 wherein said wired network is further adapted to receive ephemeris information associated with GNSS satellites.

4. The method of claim 1 further comprising:
receiving the first frame by a GNSS receiver; and
attempting to identify a position of the GNSS receiver using information received from the first frame and information representative of a distance between the GNSS receiver and the second wireless device.

5. The method of claim 1 wherein the first frame includes Geolocation information representative of a position of the first wireless device.

6. The method of claim 5 wherein said Geolocation information includes time stamp representative of transmission time of the first frame.

7. The method of claim 4 further comprising:
receiving at least one GNSS signal from at least one GNSS satellite by the GNSS receiver; and
attempting to identify the position of the GNSS receiver using information received from the first frame and the at least one GNSS signal.

8. The method of claim 7 further comprising:
receiving a second frame transmitted by a third wireless device substantially synchronously with the GNSS time; said second frame enabling the second wireless device to approximate its position relative to the third wireless device; and
attempting to identify a position of the second wireless device using information received from the first frame, second frame, and the at least one GNSS signal.

9. The method of claim 3 further comprising:
transmitting the ephemeris information wirelessly to the first wireless device; and
transmitting the ephemeris information wirelessly from the first wireless device to a GNSS receiver.

10. The method of claim 1 further comprising:
transmitting the clock signal wirelessly from the first wireless device to a GNSS receiver; and
enabling the GNSS receiver to use the clock signal to increase its integration time.

11. The method of claim 1 wherein said first wireless device is a WiFi device.

12. A method of locating a position of a wireless receiver, the method comprising:
receiving, from a wired network, by a customer premises unit timing information that is substantially synchronous with a GNSS clock;
transmitting the timing information wirelessly by the customer premises unit to the wireless receiver; and
locating the position of the wireless receiver using the transmitted timing information.

13. The method of claim 12 wherein said wireless receiver is a GNSS receiver.

14. The method of claim 12 wherein said wireless receiver is a WiFi receiver.

15. A communication system comprising:
a customer premises unit comprising:
a modem configured to receive a reference signal from a wired network, the reference signal being substantially synchronous with a GNSS time;
a first wireless transceiver coupled to the modem and configured to transmit a frame including timing information associated with the reference signal; and
a second wireless transceiver configured to receive the frame and determine a position in response to the received frame.

16. The communication system of claim 15 wherein the customer premises unit further comprises:
a first GNSS device configured to use the reference signal to improve a sensitivity and the GNSS time.

17. The communication system of claim 15 wherein the frame is synchronized with the GNSS time.

18. The communication system of claim 15 wherein the modem is a DOCSIS-compliant cable modem, the wired network is a DOCSIS-compliant network, and the reference signal comprises DTI timing information.

19. The communication system of claim 15 wherein the second wireless transceiver unit is coupled to a second GNSS receiver.

20. The communication system of claim 15 wherein the second wireless transceiver comprises:
a module for recording transmission time of the frame the second wireless transceiver transmits to the first wireless transceiver;
a module for recording receipt time of the frame after the packet is received by the first wireless transceiver and transmitted back to the second wireless device; and
a module for determining the round-trip time of the packet.

* * * * *